United States Patent
Inamura et al.

(12)

(10) Patent No.: US 6,306,061 B1
(45) Date of Patent: *Oct. 23, 2001

(54) HYDRAULIC CONTROL SYSTEM FOR CONTINUOUSLY VARIABLE TRANSMISSION

(75) Inventors: Koh Inamura; Hiroshi Ogawa, both of Tokyo (JP)

(73) Assignee: Fuji Jukogyo Kabushiki Kaisha (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/082,305

(22) Filed: May 20, 1998

(30) Foreign Application Priority Data

May 27, 1997 (JP) .................................................. 9-136528

(51) Int. Cl.⁷ .................................................. F16H 59/04

(52) U.S. Cl. .............................................. 477/45; 477/46

(58) Field of Search .......................................... 477/43–48

(56) References Cited

U.S. PATENT DOCUMENTS

| | | |
|---|---|---|
| 3,651,714 | 3/1972 | Ohya et al. . |
| 3,757,822 | 9/1973 | Kell . |
| 3,896,685 | 7/1975 | Shellman . |
| 4,034,628 | 7/1977 | Sakai et al. . |
| 4,531,927 | 7/1985 | Cadee . |
| 5,031,481 * | 7/1991 | Algain et al. ............................ 477/45 |
| 5,088,352 * | 2/1992 | Ishimaru ............................ 477/45 X |
| 5,089,964 | 2/1992 | Morishige et al. . |
| 5,169,366 * | 12/1992 | Reniers ............................ 477/45 X |
| 5,207,617 | 5/1993 | Kato et al. . |
| 5,273,492 | 12/1993 | Kashiwase et al. .................... 474/43 |
| 5,697,866 | 12/1997 | Okahara ............................... 477/169 |
| 5,782,718 * | 7/1998 | Wakahara ............................... 477/45 |

FOREIGN PATENT DOCUMENTS

| | | |
|---|---|---|
| 24 42 951 | 3/1976 | (DE) . |
| 195 19 461 | 12/1995 | (DE) .................................... 477/169 |
| 0 615 082 | 9/1994 | (EP) . |
| 2 256 244 | 12/1992 | (GB) . |
| 57-161360 | 10/1982 | (JP) . |
| 63-297852 | 12/1988 | (JP) . |
| 3-125074 | 5/1991 | (JP) . |
| 4-357357 | 12/1992 | (JP) . |

OTHER PUBLICATIONS

Patent Abstracts of Japan, vol. 017, No. 226, May 10, 1993 pertaining to JPO 4 357357.

* cited by examiner

*Primary Examiner*—Sherry Estremsky
(74) *Attorney, Agent, or Firm*—Smith, Gambrell & Russell, LLP

(57) ABSTRACT

Hydraulic pressure generated by an oil pump driven by an engine is regulated to a secondary pressure by means of a secondary pressure control valve. The secondary pressure is employed for controlling a secondary pulley and a primary pulley. On the other hand, the secondary pressure is reduced to a clutch pressure by means of a clutch pressure control valve. The communication between an apply chamber and a release chamber of a torque converter, oil chambers of actuators for a forward clutch and a reverse brake of a forward and reverse changeover apparatus and a clutch pressure line and a lubrication pressure line are controlled by means a switching valve. The clutch pressure is regulated to a high clutch pressure and to a low clutch pressure, respectively by controlling reverse signal pressures supplied to these outer pilot chambers. Thus, respective hydraulic controls for the pulleys, the lockup clutch and the forward and reverse changeover apparatus can be performed independently by use of a single hydraulic pressure source.

9 Claims, 12 Drawing Sheets

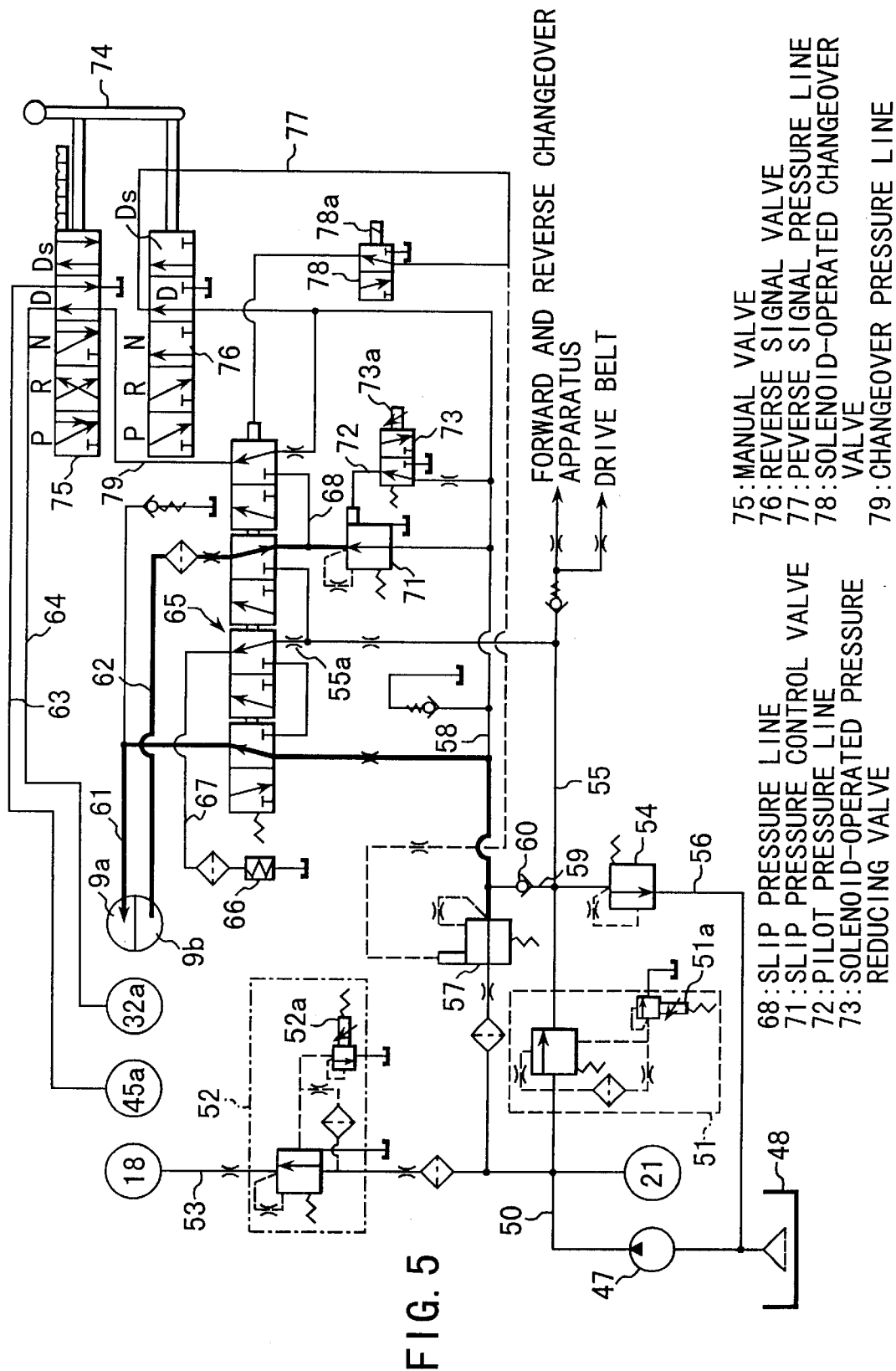

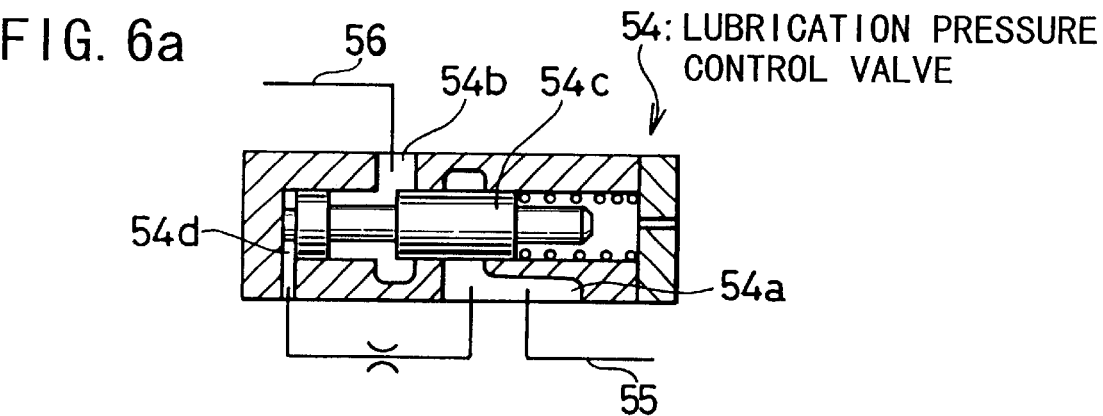
FIG. 6a  54: LUBRICATION PRESSURE CONTROL VALVE
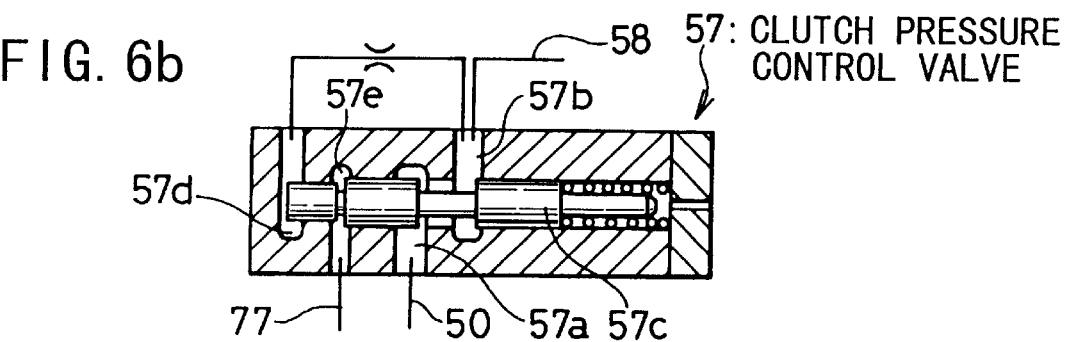
FIG. 6b  57: CLUTCH PRESSURE CONTROL VALVE
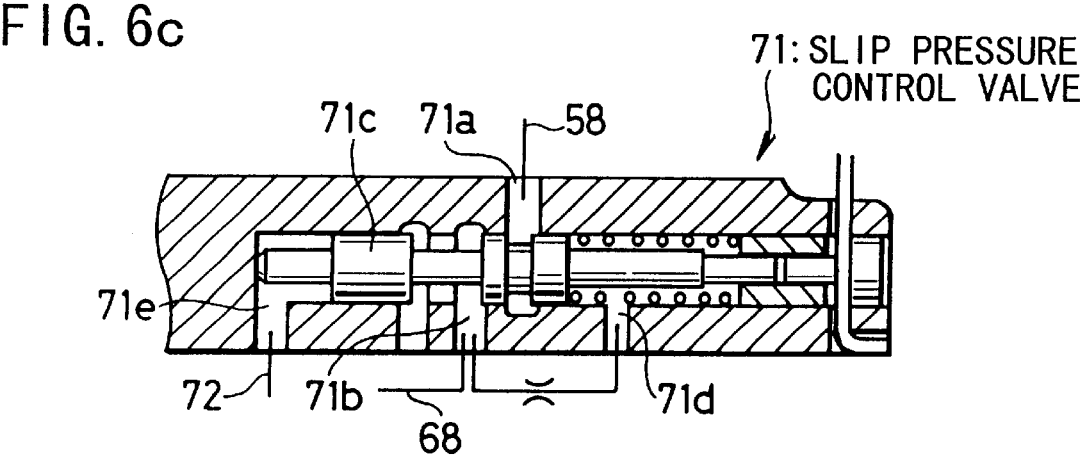
FIG. 6c  71: SLIP PRESSURE CONTROL VALVE

HYDRAULIC CONTROL SYSTEM FOR CONTINUOUSLY VARIABLE TRANSMISSION

BACKGROUND OF THE INVENTION

1. Field of the Invention

The present invention is related to a hydraulic control system for a vehicular continuously variable transmission and, more particularly to a hydraulic control system for controlling a forward and reverse changeover apparatus and a lockup clutch incorporated in the continuously variable transmission.

2. Discussion of the Prior Arts

There is known a belt-and-pulley type continuously variable transmission whose speed ratio is continuously variable. The continuously variable transmission comprises a power transmission mechanism serving to change speeds, a torque converter serving as a starting device for assisting the start of the vehicle, a forward and reverse changeover apparatus serving to change the running directions, forward and reverse, of the vehicle, a lockup clutch provided in the torque converter for mechanically engaging the crankshaft with the power transmission mechanism and a hydraulic control apparatus for operating or controlling the transmission mechanism, the forward and reverse changeover apparatus, the lockup clutch and others.

The power transmission mechanism includes an input and an output shaft, a pair of variable-diameter pulleys provided on the input and output shafts, respectively, and a belt connecting the pulleys for transmitting power therebetween. The speed ratio between the input and output shafts is obtained by changing the effective diameter of the pulleys through hydraulic pressure generated in the hydraulic control apparatus.

The forward and reverse changeover apparatus includes a planetary gear assembly, a forward clutch and a reverse brake. When a driver operates a select lever to select a forward range, the forward clutch is engaged by the help of a hydraulic pressure supplied from the hydraulic control apparatus. Further, when a reverse range is selected, the reverse brake is applied.

The lockup clutch is also controlled by the hydraulic control apparatus and when the vehicle speed exceeds a specified value the hydraulic pressure is applied to an actuator of the lockup clutch so as to connect an impeller with a turbine of the torque converter.

Japanese Patent Application Laid-open No. Toku-Kai-Shou 57-161360 discloses a hydraulic control system in which the diameter of the pulleys, the engagement or disengagement of the forward clutch and the application or releasing of the reverse brake and the engagement or disengagement of the lockup clutch are controlled through a line pressure supplied from one unit of an oil pump driven by an engine. This type of hydraulic control system has a defect in that the variation of the line pressure caused by the fluctuation of engine torque or accompanied by the speed ratio control may affect the operation of the forward clutch and the like adversely.

As a technique for solving the problem, Japanese Patent Application Laid-open No. Toku-Kai-Shou 63-297852 proposes a hydraulic control system having two oil pumps, one for high pressure and the other for low pressure in which the speed ratio control is performed by the high pressure oil pump and other controls such as the forward clutch control and the lockup clutch control are dependent on the low pressure oil pump.

As described in Japanese Patent Application Laid-open No. Toku-Kai-Hei 3-125074, there is a forward and reverse changeover apparatus including a double-pinion type planetary gear assembly and friction engagement elements. Since this type of forward and reverse changeover apparatus is designed such that the torque exerted on the reverse brake when the reverse range is selected is double that exerted on the forward clutch when the forward range is selected, the reverse brake must be large in size compared to the forward clutch because of its increased friction force capacity.

On the other hand, in a case where a driver moves the select lever to the reverse range inadvertently during running forwardly, the reverse brake is engaged before the forward clutch is released and an "interlocking" phenomenon occurs between the forward clutch and the reverse brake, this incurring an abnormal shock or leading to a burning in the reverse brake. To prevent the "interlocking", there is a known technique that no restrictor is provided in the drain passage from the forward clutch in order to discharge working fluid rapidly and a restrictor is provided in the oil supplying passage to the reverse brake so as to delay the engagement of the reverse brake.

However, this restrictor has an adverse effect in that when the select lever is placed from the neutral (N) position to the reverse (R) position under the state of idling, a driver may feel some degree of delay in the vehicle starting due to the delay of the engagement of the reverse brake.

With respect to a technique to prevent the inadvertent shift to the reverse (R) range, Japanese Patent Application Laid-open No. Toku-Kai-Hei 4-357357 proposes a hydraulic control system having a safety-lock valve to release hydraulic pressure from the oil chamber of cylinders for operating the forward clutch and the reverse brake, respectively.

SUMMARY OF THE INVENTION

It is an object of the present invention to provide a simple and cheap hydraulic control system capable of independently precisely performing respective controls of the pulley, the lockup clutch and the friction engagement elements of the forward and reverse changeover apparatus, without interference with each other.

It is a further object of the present invention to provide a hydraulic control system having a reverse brake of small size with an adequate torque capacity.

It is another object of the present invention to provide a hydraulic control system capable of preventing "interlocking" between the forward clutch and the reverse brake without using the safety lock valve, while minimizing the delay of the engagement of the reverse brake when the select lever is shifted from the neutral range to the reverse range during idling.

The above objects may be achieved according to the principle of the present invention, which provides a hydraulic control system for a continuously variable transmission mounted on a motor vehicle having an engine, a torque converter connected with the engine via a lockup clutch for transmitting torque to said transmission, a hydraulic pressure source driven by the engine for generating a hydraulic pressure, a forward and reverse changeover apparatus, and an input and an output shaft. The transmission includes a primary pulley provided on the input shaft, a secondary pulley provided on the output shaft and a drive belt wound around the primary and secondary pulleys. The control system comprises: actuators for actuating the forward and reverse changeover apparatus; a secondary pressure control valve for regulating the hydraulic pressure to a secondary pressure for actuating the secondary pulley; and a clutch pressure control valve for regulating the secondary pressure to a clutch pressure lower than the secondary pressure and for supplying the clutch pressure at least to either of the lockup clutch and the actuators.

The control system further comprises: a select lever provided in the passenger compartment for selecting the forward running mode or the reverse running mode; a reverse signal valve operatively being interlocked with the select lever and selectively communicating with the clutch pressure control valve for regulating the clutch pressure to a lower pressure when the select lever selects the forward running mode than when selects the reverse running mode.

The control system further comprises: a lubrication pressure line for supplying a lubrication pressure discharged from the secondary pressure control valve; a release chamber provided in the lockup clutch; a release pressure line connected with the release chamber; an oil cooler for cooling hydraulic fluid of the torque converter; a cooler line connecting with the oil cooler; an apply chamber provided in the lock-up clutch; an apply pressure line connected with the apply chamber; a clutch pressure line for supplying the clutch pressure; a slip pressure control valve for reducing the clutch pressure and generating a slip pressure; a slip pressure line for supplying the slip pressure; and a switching valve placed in either a position where the lubrication pressure line communicates with the release pressure line and simultaneously the cooler line communicates with the apply pressure line, or a position where the clutch pressure line communicates with the apply pressure line and simultaneously the slip pressure line communicates with the release pressure line. Further, the switching valve is controlled in accordance with the vehicle speed and the throttle opening angle.

DESCRIPTION OF THE DRAWING

FIG. 5 is a hydraulic circuit diagram showing a state where the hydraulic control apparatus illustrated in FIG. 3 is changed over to a lockup mode;

FIG. 6a is a sectional view of a lubrication oil pressure control valve;

FIG. 6b is a sectional view of a clutch pressure control valve;

FIG. 6c is a sectional view of a slip pressure control valve;

FIG. 9b is a top view of the actuating member illustrated in FIG. 9a;

DETAILED DESCRIPTION OD THE PREFERRED EMBODIMENT

Figure 1:
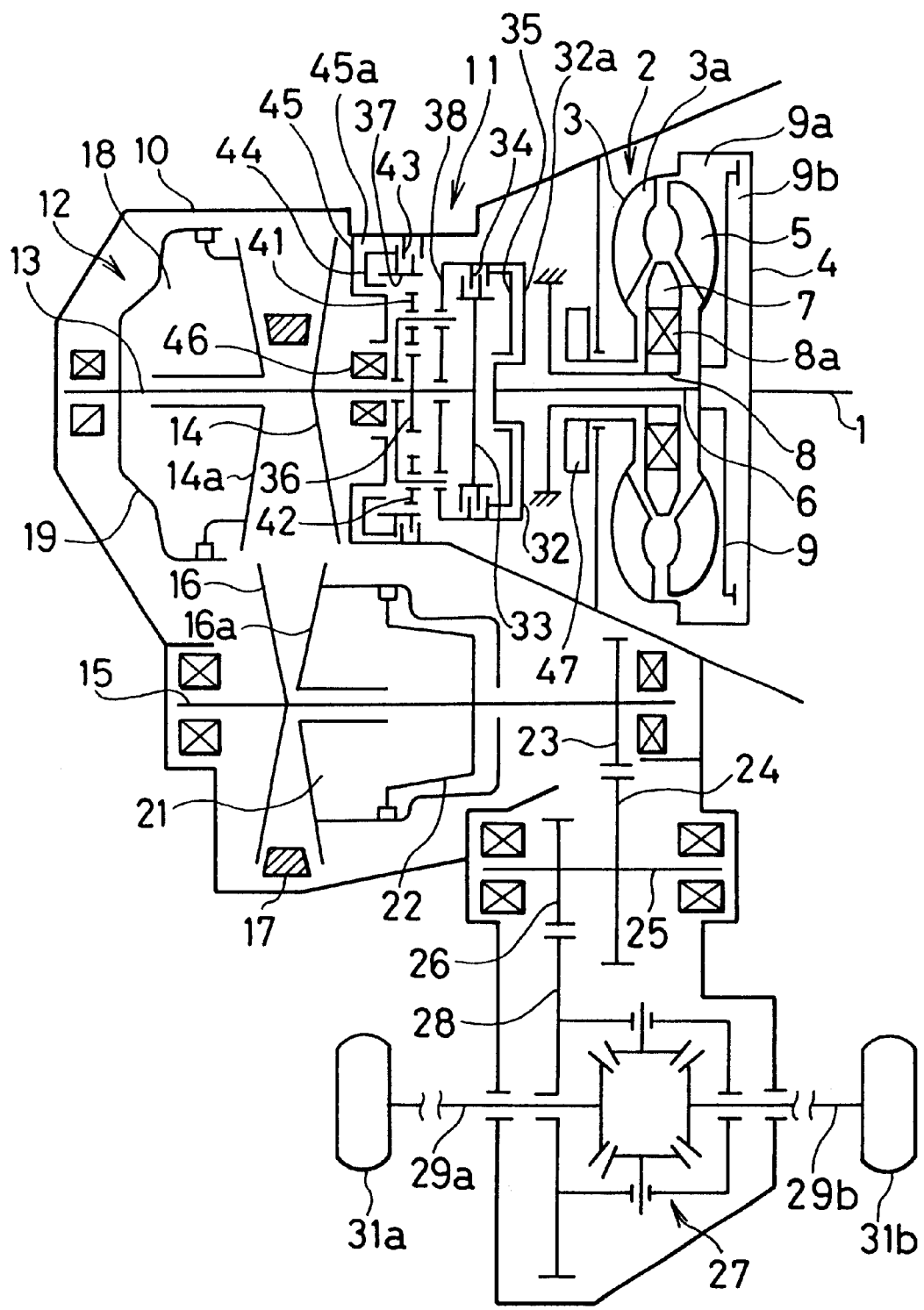
FIG. 1 is a schematic diagram showing a vehicle power transmitting system including a continuously variable transmission according to the present invention.

Referring first to FIG. 1, a crankshaft 1 driven by an engine (not shown) is directly connected with a pump impeller case 3 of a torque converter 2 through a drive plate 4. A pump impeller 3a provided in the pump impeller case 3 is opposed to a turbine runner 5 directly connecting to a turbine shaft 6. There is provided a stator 7 between the pump impeller 3a and the turbine runner 5 and the stator 7 is supported by an one-way clutch 8a which is fixed to a stator supporting shaft 8. Further, a lockup clutch 9 is directly connected with the turbine shaft 6 so as to engage and disengage with the drive plate 4. Thus, the engine power is transmitted to the turbine shaft 6 through the torque converter 2 or the lockup clutch 9.

A chamber on the left side of the lockup clutch 9 is so-called "apply chamber" 9a and a chamber on the right side thereof is so-called "release chamber" 9b. When the working fluid supplied to the release chamber 9b is circulated in the supply chamber 9a, the torque converter 2 is in the coupling condition and when the working fluid is discharged from the release chamber 9b to decrease the hydraulic pressure therein, the lockup clutch 9 is engaged with the drive plate 4 to obtain the lockup condition. Further, the lockup clutch 9 can be in the slip condition by regulating the hydraulic pressure of the release chamber 9b.

The turbine shaft 6 is connected with an input shaft 13 of a continuous variable transmission (hereinafter, referred to as "CVT") 12 through a forward and reverse changeover apparatus 11. A primary pulley 14 is provided on the input shaft 13 and a displaceable sheave 14a is slidably mounted on the input shaft in the opposite position to the primary pulley 14 through a fitting such as a ball spline so as to slide in the axial direction of the input shaft 13. Thus, the space (groove width) between the primary pulley 14 and the displaceable sheave 14a can be varied. On the other hand, there is provided an output shaft 15 in parallel with the input shaft 13 and a secondary pulley 16 is connected to the output shaft 15. A displaceable sheave 16a is slidably mounted on the output shaft 15 in the opposite position to the secondary pulley 16, in the same manner as the displaceable sheave 14a, so as to slide in the axial direction of the output shaft 15 for varying the space (groove width) between the secondary pulley 16 and the displaceable sheave 16a. In FIG. 1, the reference numeral 10 denotes a housing for accommodating the CVT 12.

The primary pulley 14 is connected with the secondary pulley 16 through a drive belt 17 wound thereround. The rotational speed of the output shaft 15 is continuously varied by changing the winding diameter of the drive belt 17 with respect to the pulleys 14, 16 according to the spacing operation of the displaceable sheaves 14a, 16a as described above.

In order to vary the groove width of the primary pulley 14, a primary oil chamber 18 is formed by the displaceable sheave 14a and a cylinder 19 provided on the input shaft 13. Similarly, in order to vary the groove width of the secondary pulley 16, a secondary oil chamber 21 is formed by the displaceable sheave 16a and a plunger 22 provided on the output shaft 15.

The output shaft 15 is connected with an intermediate shaft 25 through gears 23, 24 and a gear 26 provided on the intermediate shaft 25 meshes with a final gear 28 of a differential 27. The differential 27 has axle shafts 29a, 29b which are connected at the ends thereof with wheels, 31a and 31b, respectively.

The forward and reverse changeover apparatus 11 includes a clutch cylinder 32 provided on a forward clutch drum which is fixed to the turbine shaft 6 and a clutch hub 33 fixed on the input shaft 13. A forward clutch 34 of multi-disc type is provided between the clutch cylinder 32 and the clutch hub 33. Further, a hydraulic piston 35 for actuating the forward clutch 34 is incorporated in the clutch cylinder 32. Therefore, when a hydraulic pressure is supplied to the clutch cylinder 32 to engage the forward clutch 34, the rotation of the turbine shaft 6 is transmitted to the input shaft 13 through the clutch hub 33.

Figure 2:
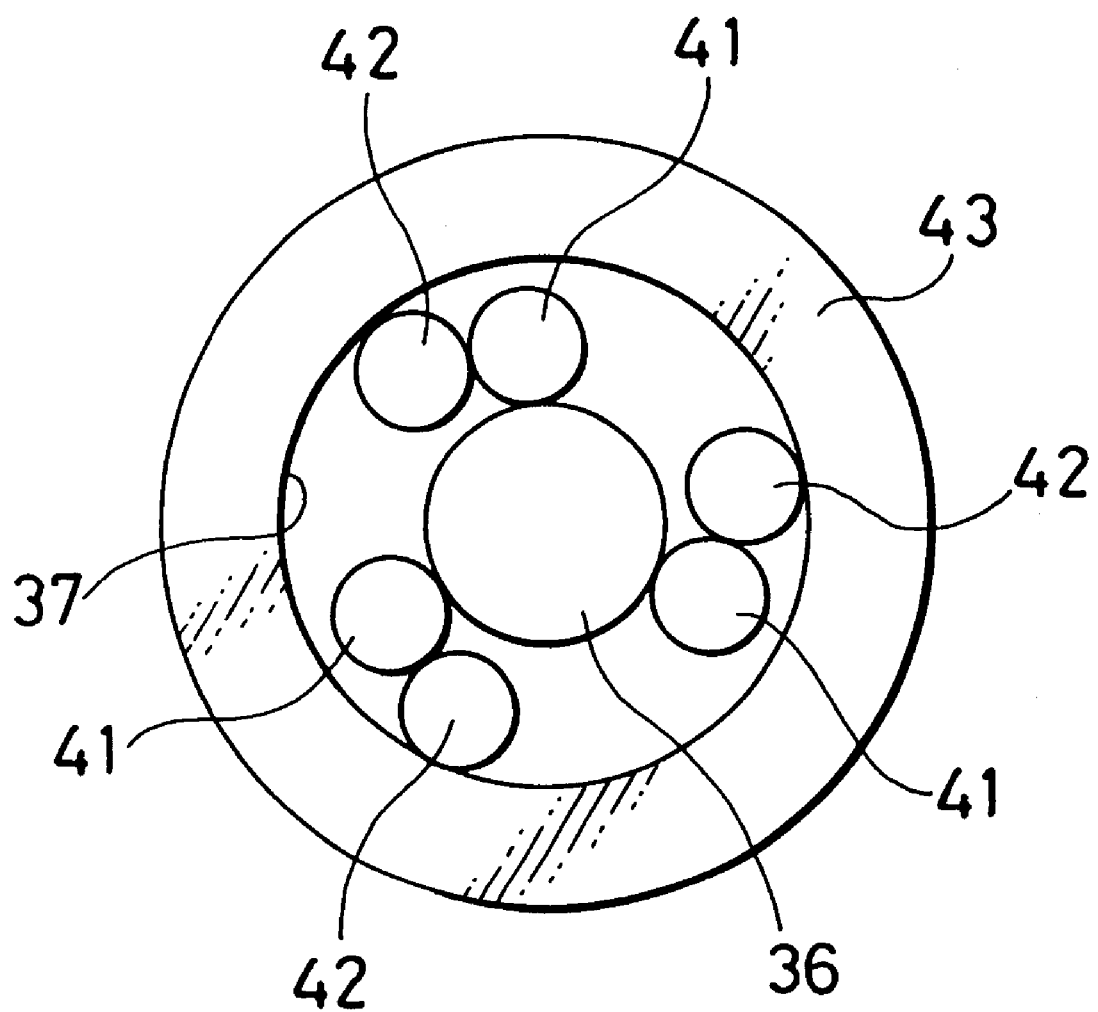
FIG. 2 is a schematic diagram showing a reverse brake of the forward and reverse changeover apparatus illustrated in FIG. 1.

The input shaft 13 is connected with a sun gear 36 and there is rotatably provided a ring gear 37 along the outer periphery of the sun gear 36. Further, a carrier 38 which is fixed to the forward clutch drum having the clutch cylinder 32 is rotatably connected with planetary pinions 41, 42 meshing with each other. The pinion 41 meshes with the sun gear 36 and the other pinion 42 meshes with the ring gear 37. In a preferred embodiment, as shown in FIG. 2, a plurality of sets of pinions 41, 42 are arranged around the sun gear 36.

There is provided a multi-disc type reverse brake 43 between the ring gear 37 and the housing 10 and a hydraulic piston 44 for actuating the reverse brake 43 is incorporated in a brake cylinder 45 formed on the housing 10. Accordingly, when a hydraulic pressure is supplied to an oil chamber 45a of the brake cylinder 45 to hold the reverse brake 43 in the brake condition while the forward clutch 34 is disengaged, the ring gear 37 is fixed to the housing 10 and as a result the carrier 38 is rotated together with the turbine shaft 6. At this moment, since paired pinions 41, 42 are revolved around the sun gear 36 while the pinion 41 is rotated in the opposite direction, the sun gear 36, i.e., the input shaft 13 is rotated reversely with respect to the rotational direction of the turbine shaft 6.

According to the transmission thus constituted, since the reverse brake 43 is disposed around the outer periphery of the ring gear 37, the brake cylinder 45 is restricted in the location and the size thereof and therefore the pressure receiving area of the brake cylinder 45 cannot be larger than that of the clutch cylinder 32 having a relatively less restriction in designing. Further, since the ring gear 37 is subjected to reaction forces from both input and output torques, the brake cylinder 45 needs a larger hydraulic power, i.e., the oil chamber 45a of the brake cylinder 45 needs a higher hydraulic pressure than the oil chamber 32a of the clutch cylinder 32.

As a hydraulic power source for operating the brake cylinder 45 and the clutch cylinder 32, an oil pump 47 is disposed in the housing 10. The oil pump 47 is driven by the crank shaft 1 via the pump impeller case 3.

Figure 3:
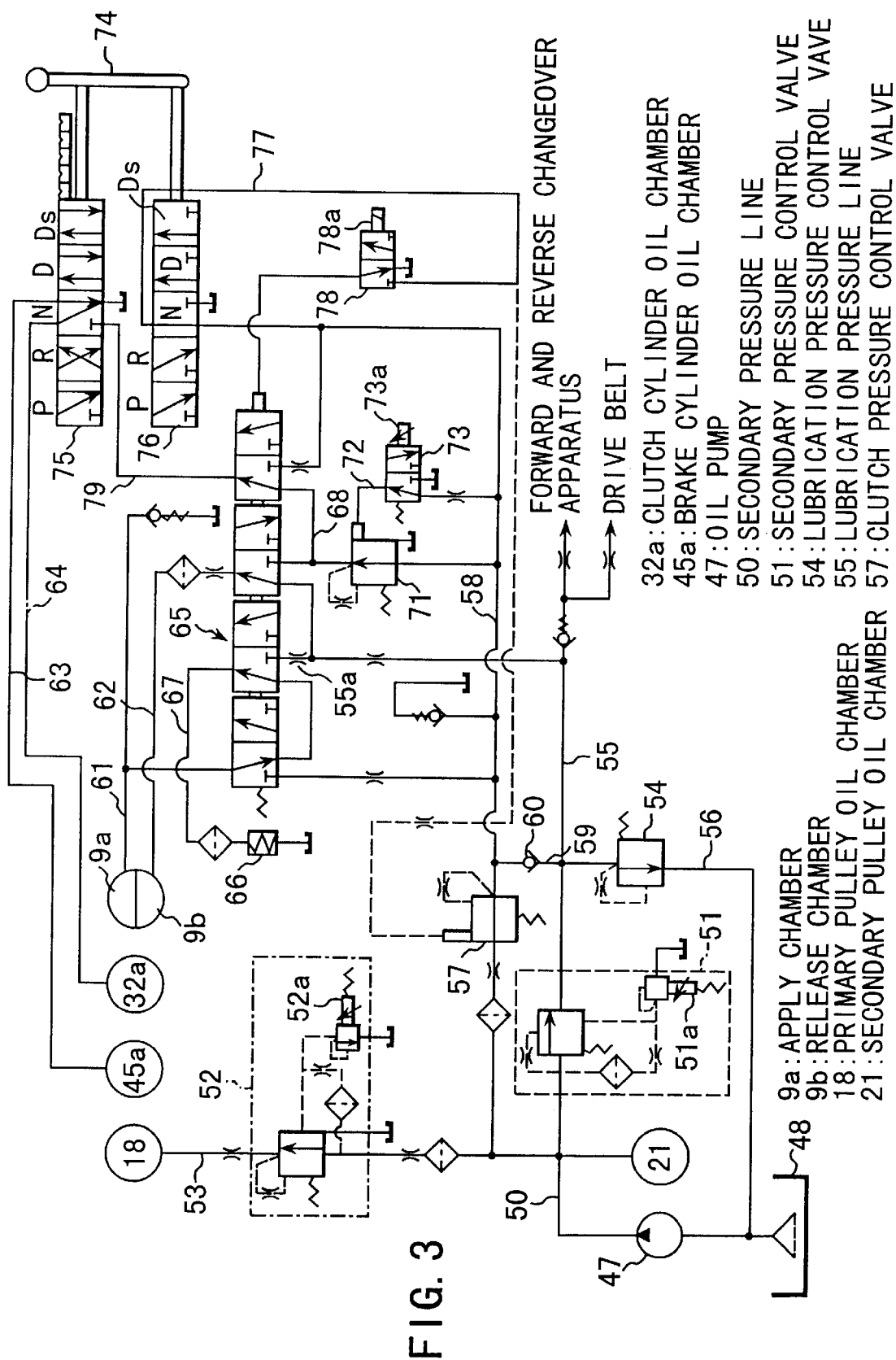
FIG. 3 is a hydraulic circuit diagram showing a hydraulic control apparatus for controlling the operation of the power transmitting system illustrated in FIG. 1.

FIG. 3 is a schematic diagram showing a hydraulic circuit for controlling the power transmitting system shown in FIG. 1. The hydraulic fluid pumped up from an oil pan 48 is supplied to a secondary pressure line 50. The secondary pressure line 50 is connected with the secondary oil chamber 21 (see FIG. 1) for actuating the displaceable sheave 16a of the secondary pulley 16 and a secondary pressure port of a secondary pressure control valve 51. The secondary pressure control valve 51 acts to regulate the secondary pressure to a specified value within a range of 1 to 3 MPa (Megapascal) for example. This value corresponds to a power transmitting capacity of the drive belt 17. That is, when the engine power is large, like in the case of hill climbing or sharp acceleration, the secondary pressure is raised to prevent the drive belt 17 from slipping and when the engine power is small, while the secondary pressure is decreased to prevent a power loss of the oil pump 47 and raise a power transmitting efficiency.

The secondary pressure line 50 is connected with a secondary pressure port of a primary pressure control valve 52. The primary pressure control valve 52 is connected at a primary pressure port thereof with a primary pressure line 53. The primary pressure line 53 is connected with the primary oil chamber 18 (see FIG. 1) for actuating the displaceable sheave 14a of the primary pulley 14. The primary pressure regulated by the primary pressure control valve 52 is supplied to the primary oil chamber 18. Since this primary pressure is a regulated or reduced amount of the secondary pressure, it never exceeds the secondary pressure. Since the pressure receiving area of the primary oil chamber 18 is established to be larger than that of the secondary oil chamber 21, the clamping force of the drive belt 17 in the primary pulley 14 can be larger than that in the secondary pulley 16. Thus, since the pressure receiving area of the primary oil chamber 18 is established to be large, compared to that of the secondary oil chamber 21, the primary pressure is a primary factor for determining a target speed ratio of the continuously variable transmission.

The secondary pressure control valve 51 and primary pressure control valve 52 include an electromagnetic type relief valve for establishing secondary pressure and primary pressure according to a current value supplied to proportional type solenoids 51a and 52a, respectively. In this case, well known duty solenoids may be used in place of the proportional type solenoids.

On the drain side of the secondary pressure control valve 51, there is provided a lubrication oil pressure control valve 54 acting as a relief valve. A lubrication oil pressure supplied to a lubrication pressure line 55 is adjusted to 0.2 to 0.4 MPa by the lubrication oil pressure control valve 54 and fed to the drive belt 17, the planetary gear assembly of the forward and reverse changeover apparatus 11 and the release chamber 9b of the lockup clutch 9.

FIG. 6a is a sectional view showing the lubrication pressure control valve 54, whose valve housing includes a port 54a connected to the lubrication pressure line 55 and a port 54b connected to a drain line 56. Further, the valve housing includes a spool 54c biased by a spring force in the axial direction of the valve housing. Further, the valve housing includes an inner pilot chamber 54d to which the lubrication pressure of the port 54a is supplied. When the lubrication pressure of the lubrication pressure line 55 is increased, the spool 54c is displaced against the spring force to release the lubrication pressure through the drain line 56, whereby the lubrication pressure is set to a specified value.

The secondary pressure line 50, as shown in FIG. 3, is connected with a clutch pressure control valve 57 which serves as a pressure reducing valve. The clutch pressure control valve 57 supplies a clutch pressure through a discharge port thereof to a clutch pressure line 58. The clutch pressure is set to a low value like 0.7 MPa, when the forward range is selected and it is set to a high value like 1.2 MPa, when the reverse range is selected.

Further, there is provided a bypass line 59 across the clutch pressure line 58 and the lubrication pressure line 55. The bypass line 59 is provided with a check valve 60 for blocking the hydraulic fluid flowing from the clutch pressure line 58 to the lubrication pressure line 55 and for allowing the hydraulic fluid to flow from the lubrication pressure line 55 to the clutch pressure line 58 only when the lubrication pressure is higher than the clutch pressure.

FIG. 6b is a sectional view showing the clutch pressure control valve 57, whose valve housing includes a port 57a connected to the secondary pressure line 50 and a port 57b connected to the clutch pressure line 58. Further, the valve housing includes a spool 57c biased by a spring force in the axial direction of the valve housing. Further, the valve housing includes an inner pilot chamber 57d to which the hydraulic pressure of the port 57b is supplied and an outer pilot chamber 57e. A force against the spring force is exerted to the spool 57c by the hydraulic pressure supplied to both the pilot chambers 57d, 57e. Thus, a low clutch pressure like 0.7 MPa is supplied to the clutch pressure line 58 by supplying an outer pilot pressure to the outer pilot chamber 57e and a high clutch pressure like 1.2 MPa is supplied to the clutch pressure line 58 by stopping a supply of the outer pilot pressure.

As shown in FIG. 3, there are provided an apply pressure line 61 connected with the apply chamber 9a, a release pressure line 62 connected with the release chamber 9b, a brake changeover pressure line 63 connected with the brake oil chamber 45a for actuating the reverse brake 43, a clutch changeover pressure line 64 connected with the clutch oil chamber 32a for actuating the forward clutch 34 and a switching valve 65 for controlling the connection with the lubrication pressure line 55 and the clutch pressure line 58.

Figure 4:
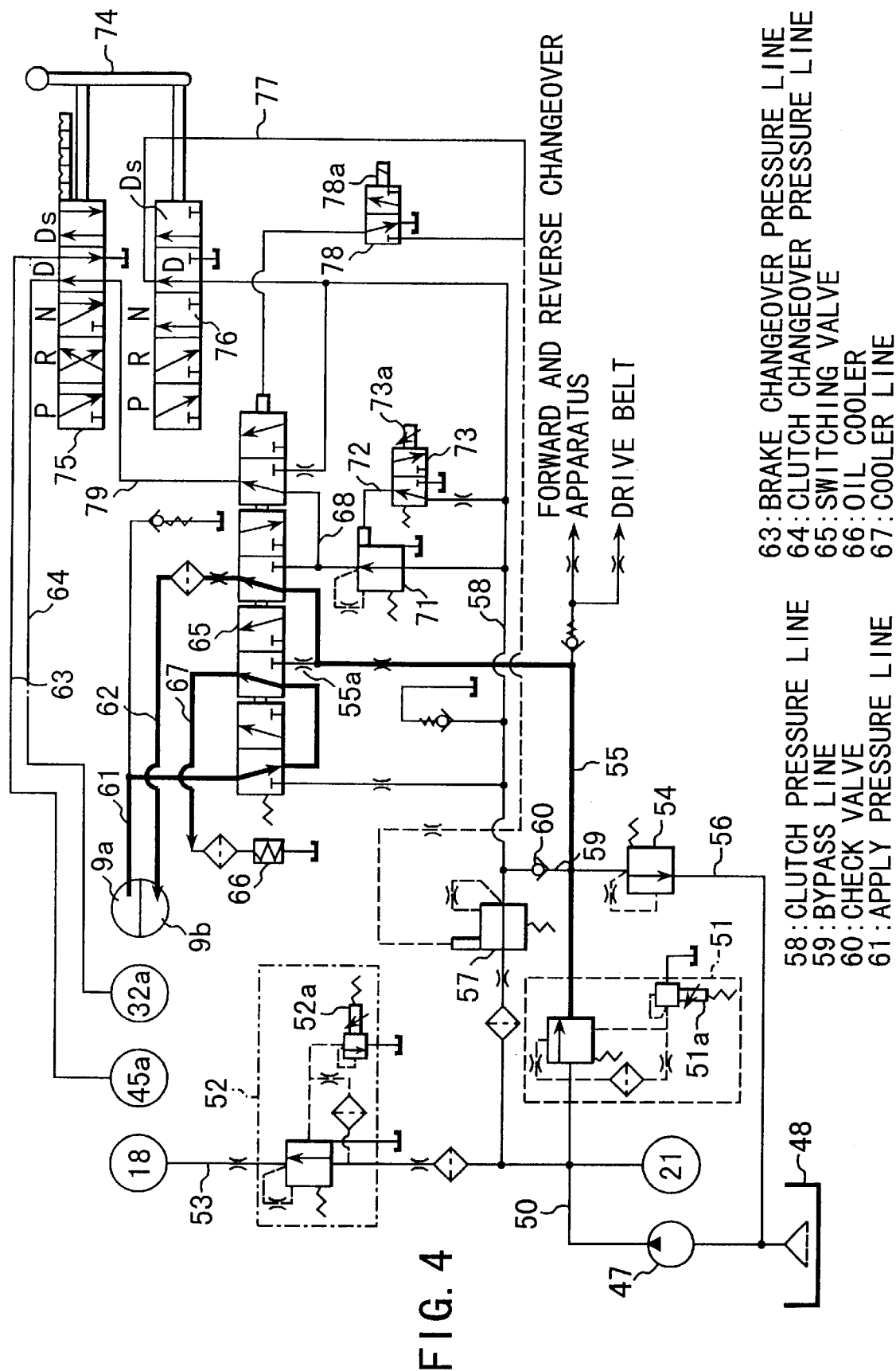
FIG. 4 is a hydraulic circuit diagram showing a state where the hydraulic control apparatus illustrated in FIG. 3 is changed over to an F & R mode.

The switching valve 65 is composed of four elements having three-port selector valves and it acts as a two-position valve: a control position of the forward and reverse changeover apparatus 11 under the condition where the outer pilot pressure is not applied as shown in FIG. 3 and FIG. 4 and another control position of the lockup clutch 9 under the condition where the outer pilot pressure is applied as shown in FIG. 5.

When the forward and reverse changeover apparatus 11 is in the control position, as shown in FIG. 4, the lubrication pressure line 55 communicates with the release pressure line 62 through the switching valve 65 and a cooler line 67 having an oil cooler 66 communicates with the apply pressure line 61. In this state, the hydraulic circuit turns to an F & R mode in which the torque converter 2 is operative and the hydraulic control of the forward and reverse changeover apparatus 11 is available. At this time, the hydraulic pressure of the lubrication pressure line 55 is supplied to the release chamber 9b and it is discharged from the apply chamber 9a to the oil pan 48 through the oil cooler 66.

On the other hand, when the lockup clutch 9 is in the control position, as illustrated in FIG. 5, the clutch pressure line 58 communicates with the apply pressure line 61 and the clutch pressure is supplied to the apply chamber 9a. At this moment, a slip pressure line 68 connected with the clutch pressure line communicates with the release pressure line 62. The slip pressure line 68 is provided with a slip pressure control valve for adjusting the slip pressure supplied to the slip pressure line 68 to a required pressure ranging from the same pressure as the clutch pressure to a zero pressure according to the outer pilot pressure supplied to the outer pilot chamber of the slip pressure control valve 71. When the slip pressure becomes zero, the lockup clutch 9 is in the engagement position, i.e., in the lockup condition. On the other hand, the slip pressure becomes the same as the clutch pressure, the lockup clutch 9 is released. Thus, the intermediate state between the full engagement and release of the lockup clutch is referred to as "Lockup Mode" in which the rotational difference of the lockup clutch 9 is controlled to be constant by properly regulating the slip pressure.

When the switching valve 65 is in the lockup mode condition, the lubrication pressure line 55 communicates with the cooler line 67 via the switch valve 65. A restrictor 55a provided at the inlet of the switching valve 65 is for restricting the flow of lubrication oil.

In order to supply the out er pilot pressure to the slip pressure control valve 71, a pilot pressure line 72 is connected across the pilot port of the slip pressure control valve 71 and the clutch pressure line 58. The pilot pressure line 72 is provided with a solenoid -operated pressure reducing valve 73. In this embodiment, the solenoid used for the pressure reducing valve 73 is a duty type solenoid which regulates the pressure by changing the duty ratio of the current supplied to the solenoid but alternatively the solenoid may be a proportional type solenoid which is employed in the secondary pressure control valve 51.

FIG. 6c is a sectional view showing the slip pressure control valve 71, whose valve housing includes a port 71a connected to the clutch pressure line 58 a n d a port 71b connected to the slip pressure line 68. Further, the valve housing incorporates a spool 71c biased by a spring force in the axial direction. Further, there are formed an inner pilot chamber 71d to which the hydraulic pressure of the port 71b is supplied and an outer pilot chamber 71e in the housing. The outer pilot chamber 71e is connected with a pilot pressure line 72. When the hydraulic pressure is supplied to the out er pilot chamber 71e through the pilot pressure line 72, a force is applied to the spool 71c against the spring force and the plunger force of the inner pilot chamber 71d, so that the pressure applied to the release chamber 9b via the slip pressure line 68 is controlled.

In the passenger compartment, there is provided with a mode selecting control lever, i.e., a select lever 74. The select lever is interconnected with a manual valve 75 and a reverse signal valve 76, respectively. Respective valves 75, 76 operates in five positions that correspond to drive ranges "P" (parking), "R" (reverse), "N" (neutral), "D" (drive) and "Ds" (sport drive) selected by the select lever 74.

Figure 7A:
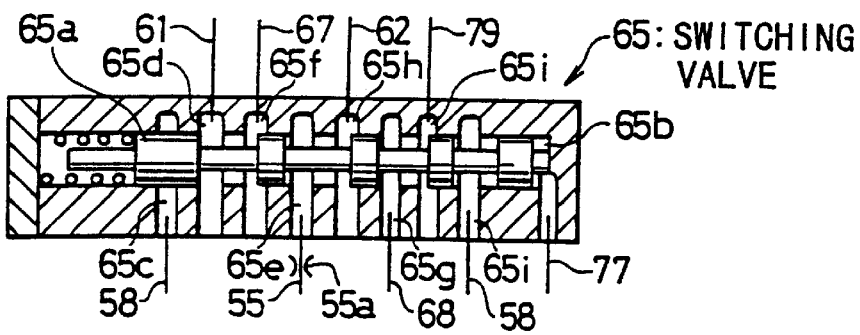
FIG. 7a is a sectional view of a switching valve in a F & R mode position.
Figure 7B:
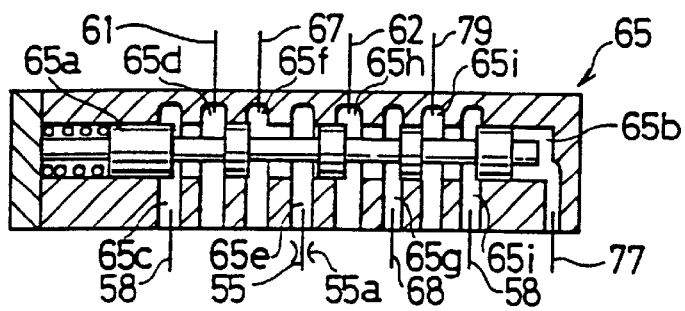
FIG. 7b is a sectional view of a switching valve in a lockup mode position.

The clutch pressure line 58 communicates with a reverse signal pressure line 77 via the reverse signal valve 76 and the reverse signal pressure line 77 is provided with a three-port type solenoid-operated changeover valve 78. When the switching valve 78 is energized, the switching valve 65 is in the lockup control position, as shown in FIG. 5 and FIG. 7b and when it is deenergized, the switching valve 65 is in the F & R mode control position, as shown in FIG. 4 and FIG. 7a. The reverse signal pressure line 77 is connected with the outer pilot chamber 57e of the clutch pressure control valve 57 as illustrated by a broken line. When the reverse signal valve 76 is positioned at either of "N", "D" and "Ds" ranges, the clutch pressure is supplied to the outer pilot chamber 57e and as a result the clutch pressure is established to a low pressure like 0.7 MPa. On the other hand, when the reverse signal valve 76 is positioned at "P" or "R" ranges, the hydraulic pressure is not supplied to the outer pilot chamber 57e of the clutch pressure control valve 57 and as a result the clutch pressure is set to a high pressure like 1.2 MPa.

There is provided a common changeover pressure line 79 across the switching valve 65 and the manual valve 75. The changeover pressure line 79 communicates with the slip pressure line 68, when the switching valve 65 turns to the F & R Mode, as shown in FIG. 4 and it communicates with the clutch pressure line 58, when the switching valve 65 turns to the Lockup Mode, as shown in FIG. 5. Further, the changeover pressure line 79 communicates with the clutch changeover pressure line 64 through the manual valve 75, when the select lever 74 is shifted to either "D" or "Ds" range and it communicates with the brake changeover pressure line 63, when the select lever 74 is shifted to "R" range.

FIGS. 7a, 7b are sectional views showing the construction of the switching valve 65, respectively. The valve housing incorporates a spool 65a slidably movable in the axial direction. There is formed an outer pilot chamber 65b to which the hydraulic pressure is applied in the axial direction against the spring force applied to the spool 65a. FIG. 7a shows a condition of the switch valve 65 in which no hydraulic pressure is applied to the outer pilot chamber 65b and FIG. 7b shows a condition in which a hydraulic pressure is applied thereto.

The switching valve 65 includes a port 65c connected with the clutch pressure line 58 and a port 65d connected with the apply pressure 61. When the outer pilot pressure is applied to the outer pilot chamber 65b, as shown in FIG. 7b, the port 65c communicates with the port 65d. Further, the switching valve 65 includes a port 65e connected with the lubrication pressure line 55 and a port 65f connected with the cooler line 67. When the outer pilot pressure is applied to the outer pilot chamber 65b, the port 65e communicates with the port 65f and when the outer pilot pressure is not applied to the outer pilot chamber 65b, as shown in FIG. 7a, the port 65d communicates with the port 65f. Further, the switching valve 65 includes a port 65g connected with the slip pressure line 68 and a port 65h connected with the release pressure line 62 and these ports 65g, 65h communicate with each other, when the outer pilot pressure is supplied. Further, the switch valve 65 includes a port 65i connected with the changeover pressure line 79 and a port 65j connected with the clutch pressure line 58. When the pilot pressure is applied, the port 65i communicates with the port 65j, as illustrated in FIG. 7b. When the pilot pressure is not applied, the release pressure line 62 communicates with the lubrication pressure line 55 and the changeover pressure line 79 communicates with the slip pressure line 68.

Figure 8:
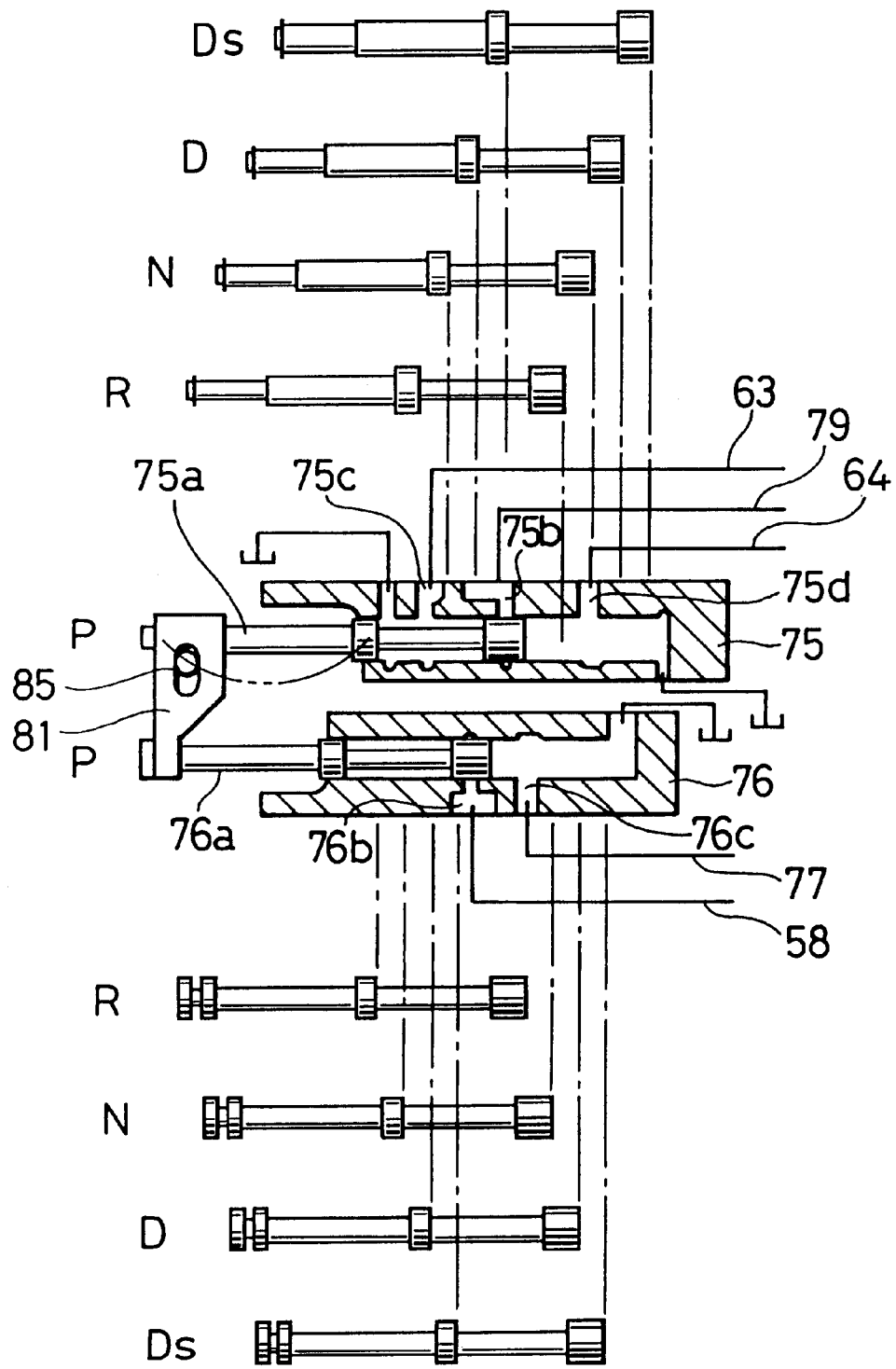
FIG. 8 is an explanatory view showing a construction of a manual valve and a reverse signal valve and showing flow passage switching conditions of these valves.

FIG. 8 is a diagram showing a construction of the manual valve 75 and the reverse signal valve 76 and the condition of the valve operation of these valves. The valves 75, 76 are spool-like changeover valves including valve rods 75a, 76a slidably movable in the axial direction, respectively. The manual valve 75 has a port 75b connected with the changeover pressure line 79 and the port 75b is closed at the position "P" so that the clutch changeover pressure line 64 and the brake changeover pressure line 63 are in the drain condition, respectively. At the "R" position, the port 75b communicates with a port 75c connected to the brake changeover pressure line 63 so that the clutch changeover pressure line 64 is in the drain condition. When the manual valve 75 is at the position "N", the port 75b is closed so that the clutch changeover pressure line 64 and the brake changeover pressure line 63 are in the drain condition, respectively. When the manual valve 75 is at the position "D" or "Ds", a port 75d connected to the clutch changeover pressure line 64 communicates with the port 75b so that the brake changeover pressure line 63 is in the drain condition.

On the other hand, the reverse signal valve 76 includes a port 76b connected to the clutch pressure line 58 and a port 76c connected to a reverse signal pressure line 77. These ports 76b, 76c are closed at the positions "P" and "R" so that the reverse signal pressure line 77 is in the drain condition. Further, at the positions "N", "D" and "Ds", the port 76b communicates with the port 76c.

Figure 9A:
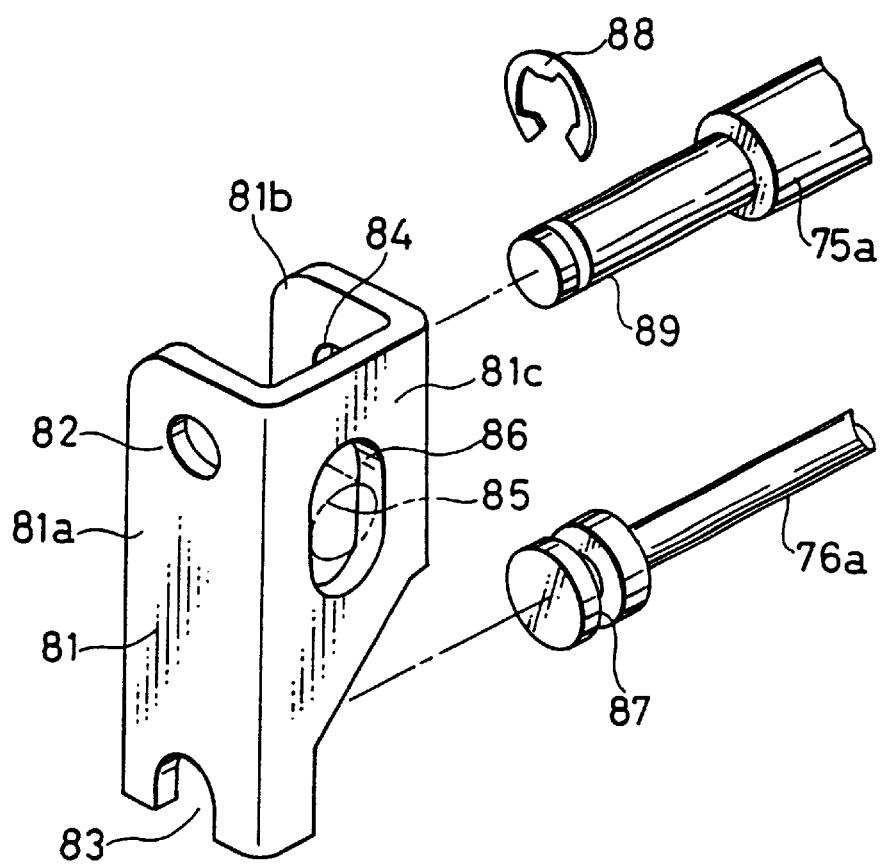
FIG. 9a is a perspective view of an actuating member illustrated in FIG. 8.
Figure 9B:
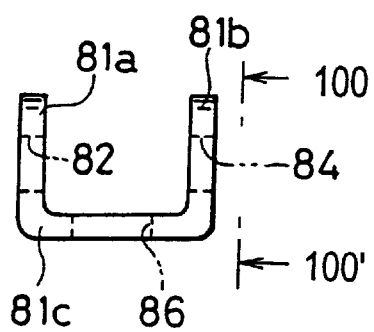
Figure 9C:
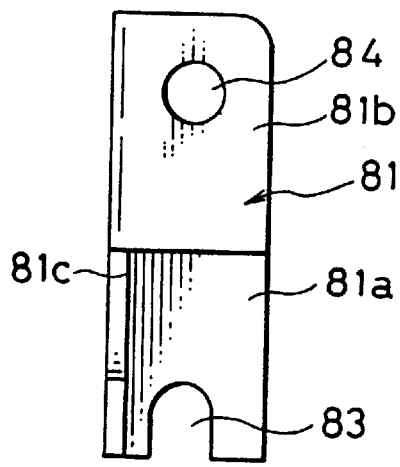
FIG. 9c is a view of the actuating member as viewed from a line 100—100.

The manual valve 75 and the reverse signal valve 76 have an actuating member 81 at the ends of the valve rods 75a, 76a. The detail of the actuating member 81 is shown in FIG. 9a. The actuating member 81 comprises a mounting plate 81a, a reinforcement plate 81b and a connecting plate 81c and it has a U-shaped section as shown in FIG. 9b. FIG. 9c is a view taken from the line 100–100'. There are formed a mounting hole 82 through which the end of the valve rod 75a penetrates and a notch 83 with which the end of the valve rod 76a is engaged on the mounting plate 81a and there are formed a through hole 84 through which the valve rod 75a penetrates on the reinforcement plate 81b. Further, there is formed a slot 86 for engaging with an operating pin 85 operated by the select lever 74 on the connecting plate 81c. The operating pin 85 travels between the positions "P" and "Ds" along an arc as shown in FIG. 8.

There is formed a groove 87 at the end of the valve rod 76a. Both valve rods 75a and 76a are mounted on the actuating member 81 by applying a snap ring 88 around a groove 89 formed at the end of the valve rod 75a after penetrating the valve rod 75a through the mounting hole 82, while the groove 87 is engaged with the notch 83 of the actuating member 81.

In a vehicle having thus constituted hydraulic control circuit, when the select lever 74 is selected at "D", "Ds" or "N" ranges, the clutch pressure line 58 communicates with the reverse signal pressure line 77 via the reverse signal valve 76, so that the clutch pressure is supplied to the outer pilot chamber 57e of the clutch pressure control valve 57, whereby a low clutch pressure is supplied to the clutch pressure line 58. Therefore, in the case where the select lever 74 is at "D" or "Ds" ranges, the low clutch pressure is supplied to the oil chamber 32a of the forward clutch 34 through the clutch pressure line 58, slip pressure line 68 and changeover pressure line 79.

When the select lever 74 is selected at "P" or "R" ranges, the reverse signal valve closes the communication between the clutch pressure line 58 and the reverse signal pressure 77 so that the outer pilot chamber 57e of the clutch pressure control valve 57 is in the drain condition, whereby a high clutch pressure is supplied to the clutch pressure line 58. Therefore, in the case where the select lever 74 is at "R" range, the high clutch pressure is supplied to the clutch pressure line 58 and the oil chamber 45a of the reverse brake 43 through the slip pressure line 68 and changeover pressure line 79.

Figure 10:
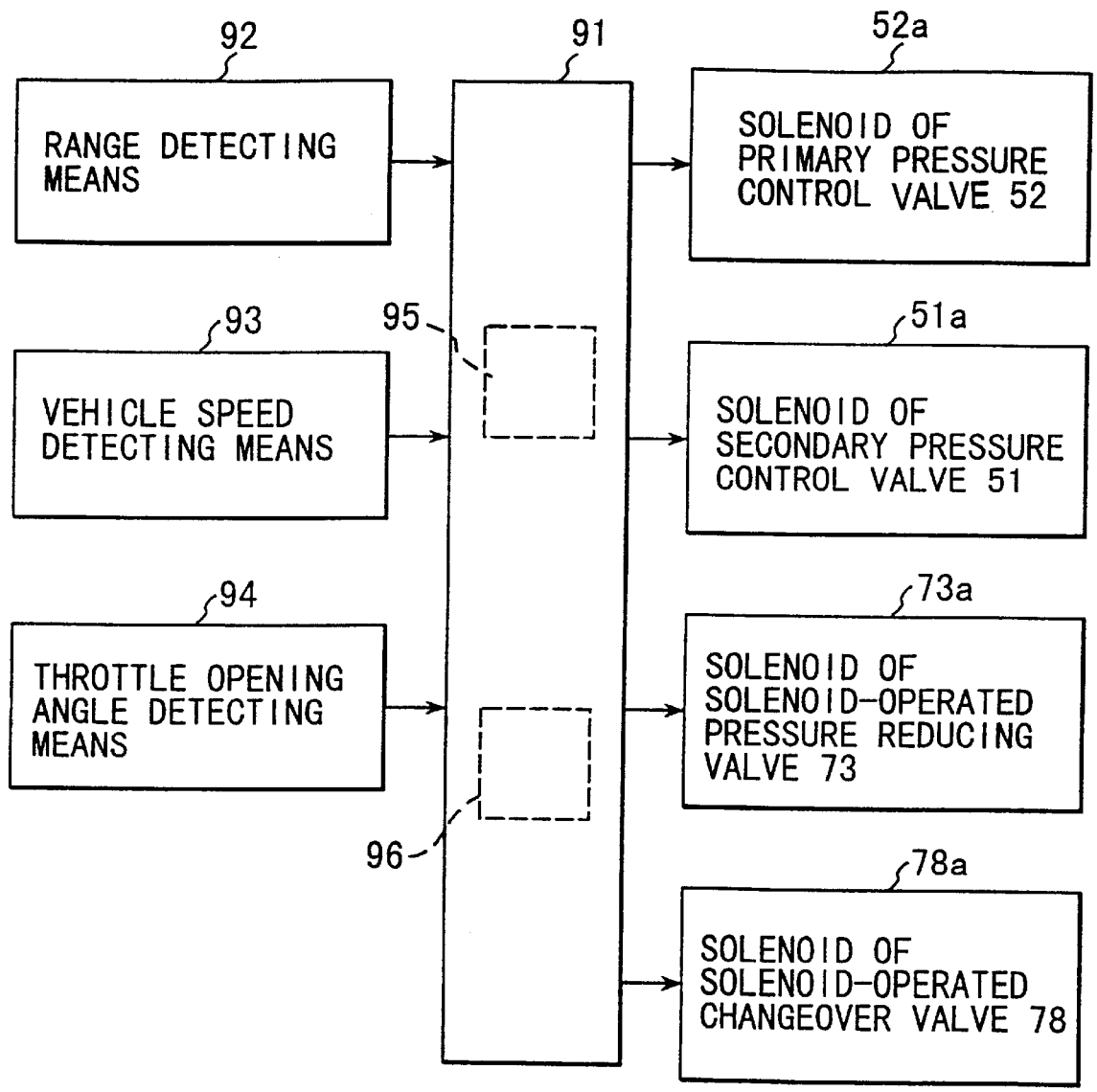
FIG. 10 is a block diagram showing a control circuit of a continuously variable transmission.

FIG. 10 is a block diagram showing a control circuit for controlling an operation of the hydraulic control unit. Reference numeral 91 denotes a control section including a central processing unit and the like. The control section 91 is connected with a range detecting means 92 for detecting a range selected by the select lever 74, a vehicle speed detecting means 93 for detecting vehicle speeds and a throttle opening angle detecting means 94 for detecting an opening angle of the throttle valve. Signals detected by these detecting means are output to the control section 91.

The control section 91 sends operating signals to the solenoid 52a of the primary pressure control valve 52, the solenoid 51a of the secondary pressure control valve 51, the solenoid 73a of the solenoid-operated pressure reducing valve 73 and the solenoid 78a of the solenoid-operated changeover valve 78, respectively.

Figure 11:
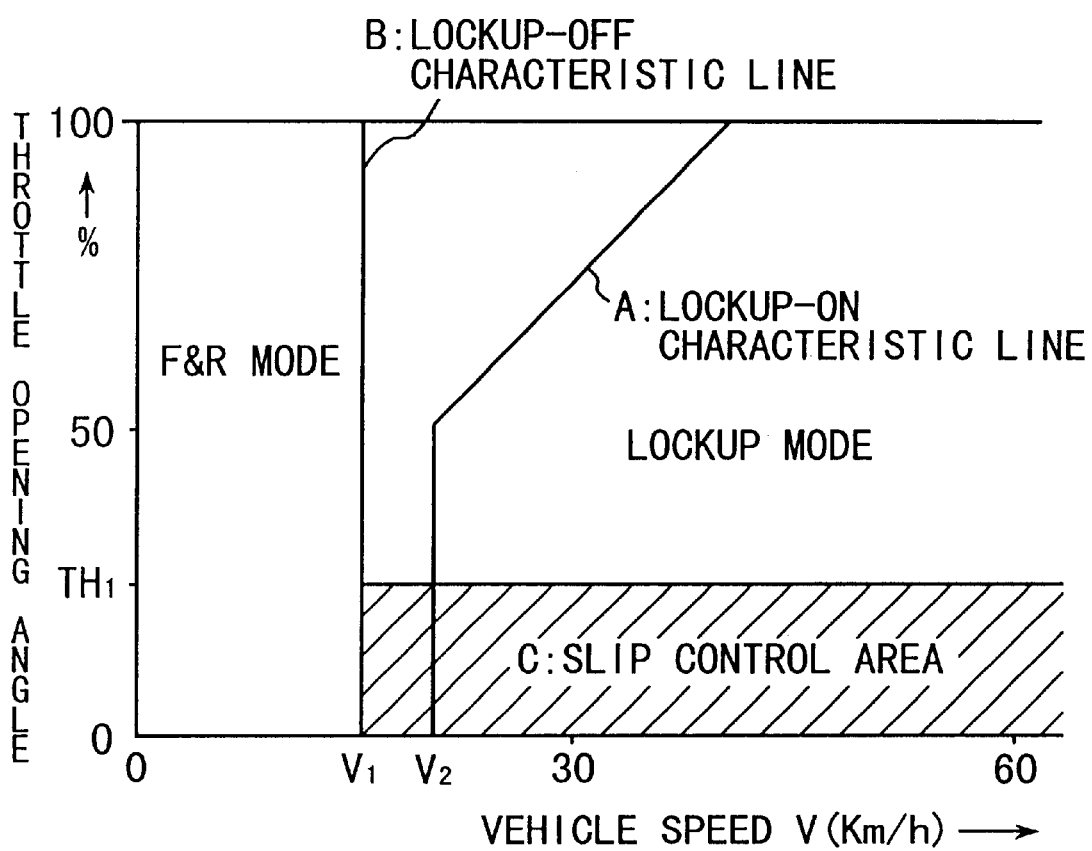
FIG. 11 is a diagram showing a lockup characteristic of the continuously variable transmission.

These respective solenoids are responsive to the operating signals control the hydraulic control circuit as shown in a lockup diagram in FIG. 11 according to the throttle opening angle and vehicle speeds. As illustrated in FIG. 11, when the throttle opening angle is small and when the vehicle speed is low, the hydraulic control circuit turns to an F & R Mode in which the torque converter 2 is operative and when the vehicle speed exceeds a specified vehicle speed V2 or a lockup-ON characteristic line "A", the hydraulic control circuit turns to a Lockup Mode. When the vehicle speed drops from the Lockup Mode and then goes below a specified vehicle speed V1 (established to be lower than V2), the control circuit turns from the Lockup Mode to the F & R Mode. Further, when the vehicle speed stays in the Lockup Mode and the throttle opening angle is below TH1, the control circuit turns to a slip control area C.

When the vehicle speed is low and the throttle opening angle is large, since the torque converter is needed to be operative with the lockup clutch released, the control circuit should be in the F & R Mode. Therefore, as shown in FIG. 4, the solenoid 78a of the solenoid-operated changeover valve 78 is deenergized, so that in the switch valve 65, as illustrated in FIG. 7a, no hydraulic pressure is applied to the outer pilot chamber 65b, whereby the spool valve 65a is urged on the right side wall of the valve housing by the spring force. As a result, the torque converter is set at the operating condition. In this mode, since the clutch pressure is supplied to the changeover pressure line 79 via the slip pressure line 68, when the select lever 74 is shifted from "N" range to "D" range or from "N" range to "R" range, the hydraulic pressure supplied to the outer pilot chamber 71e of the slip pressure control valve 71 is controlled by the solenoid-operated pressure reducing valve 73. As a result, the forward clutch 34 and the reverse brake 43 can be controlled so as to attenuate shocks which occur when the shift lever is shifted to "D" or "R" range.

When the select lever 74 is shifted to "N", "D" or "Ds" ranges, the outer pilot pressure is supplied from the reverse signal pressure line 77 to the outer pilot chamber 57e of the clutch pressure control valve 57, so that a low clutch pressure, for example, 0.7 MPa, is fed to the clutch pressure line 58. Thus, when "D" range or "Ds" range is selected, the low clutch pressure established by the clutch pressure control valve 57 is supplied to the oil chamber 32a of the forward clutch 34.

On the other hand, when the select lever 74 is shifted to "P" or "R" ranges, since the outer pilot pressure is not supplied to the outer pilot chamber 57e of the clutch pressure control valve 57, a high clutch pressure, for example 1.2 MPa, is supplied to the clutch pressure line 58. Thus, when the select lever is shifted to "R" range, the high clutch pressure is fed to the oil chamber 45a of the reverse brake 43 so that the torque capacity of the reverse brake 43 is secured.

In the F & R Mode, as shown in FIG. 4, the lubrication pressure adjusted to 0.2 to 0.4 MPa, for example, is supplied from the lubrication pressure line 55 to the release chamber 9b and the hydraulic pressure within the apply chamber 9a is returned to drain through the oil cooler 66. Thus, the lockup clutch is disengaged and the engine power is transmitted to the input shaft 13 only through the torque converter 2.

When the vehicle speed is high and the throttle opening angle is small, this situation needs a lockup. As illustrated in FIG. 5, when the solenoid 78a of the solenoid-operated changeover valve 78 is energized to operate the switch valve 65 to the lockup control position, the hydraulic control apparatus turns to a Lockup Mode. In this mode, the apply chamber 9a of the torque converter 2 communicates with the clutch pressure line 58 and the release chamber 9b communicates with the slip pressure line 68. Under these conditions, the clutch pressure is set to a low pressure by the operation of the clutch pressure control valve 57 and this low pressure is supplied to the apply chamber 9a. Therefore, by controlling the slip pressure with the slip pressure control valve 71, it is possible to engage or release the lockup clutch 9. That is, when the slip pressure is zero (0), the lockup clutch 9 is engaged and when the slip pressure is the same low pressure 0.7 MPa as the clutch pressure, the lockup clutch 9 is released. In the engaging process of the lockup clutch 9, it is possible to engage the lockup clutch without causing shock by lowering the slip pressure smoothly.

Further, by properly controlling the slip pressure, it is possible to perform a slip control of the lockup clutch in which the rotational difference of the lockup clutch is kept constant. The slip control is available when the vehicle speed and throttle opening angle are in the slip control area "C" shown in FIG. 11.

Since a larger amount of heat is generated in the torque converter 2 when the lockup clutch is released, it is necessary that more working fluid is supplied to the oil cooler 66. On the other hand, it is possible to reduce the amount of working fluid passing through the oil cooler 66. For this purpose, there is provided a restrictor 55a at the inlet of the lubrication pressure line 55 of the switching valve 65. The restrictor acts to restrict the lubrication fluid flowing into the oil cooler 66.

Figure 7C:
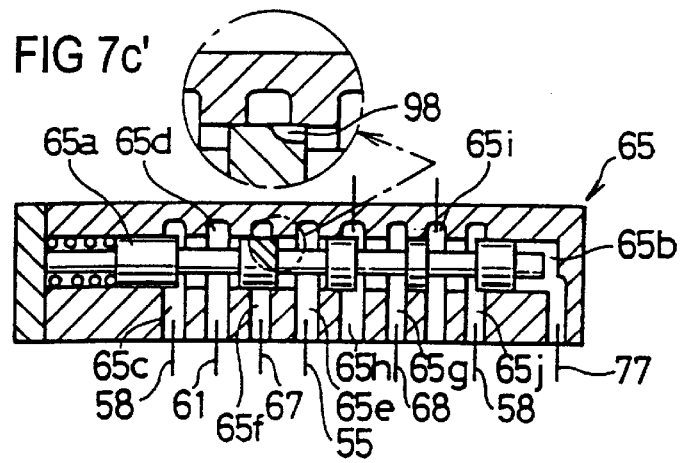
FIG. 7c is a sectional view of a switching valve of another type.
Figure 7D:
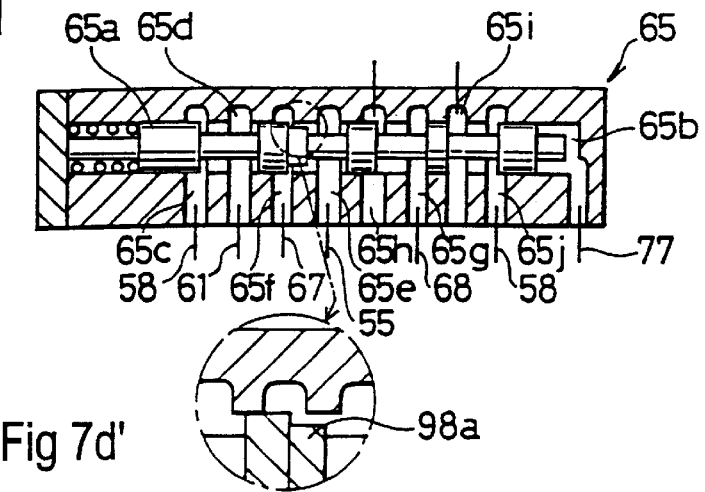
FIG. 7d is a partially sectional view of a switching valve of still another type.

If the restrictor 55a is provided independently in the valve housing of the switching valve 65, the hydraulic circuit around the switching valve 65 becomes complicated and the overall length of the switching valve 65 becomes long. In place of the restrictor 55a, as shown in FIG. 7c, there may be formed a notch in the spool between the port 65e connected to the lubrication pressure line 55 of the switching valve 65 and the port 65f connected to the cooler line 67. Further, alternatively, as shown in FIG. 7d, there may be formed a step 98a on that spool to obtain a similar effect.

As described before, since t he low clutch pressure is 0.7 MPa and the lubrication pressure is 0.2 to 0.4 MPa, the check valve 60 provided in the bypass line 59 is not operated normally. However, according to the embodiment of the present invention, even in the case where the clutch pressure is not produced due to sticking of the clutch pressure control valve 57 on the closing side, the check valve 60 opens to introduce the lubrication pressure of 0.2 to 0.4 MPa to the clutch pressure line 58, whereby a minimal clutch pressure is secured so as to enable a vehicle running.

Figure 12:
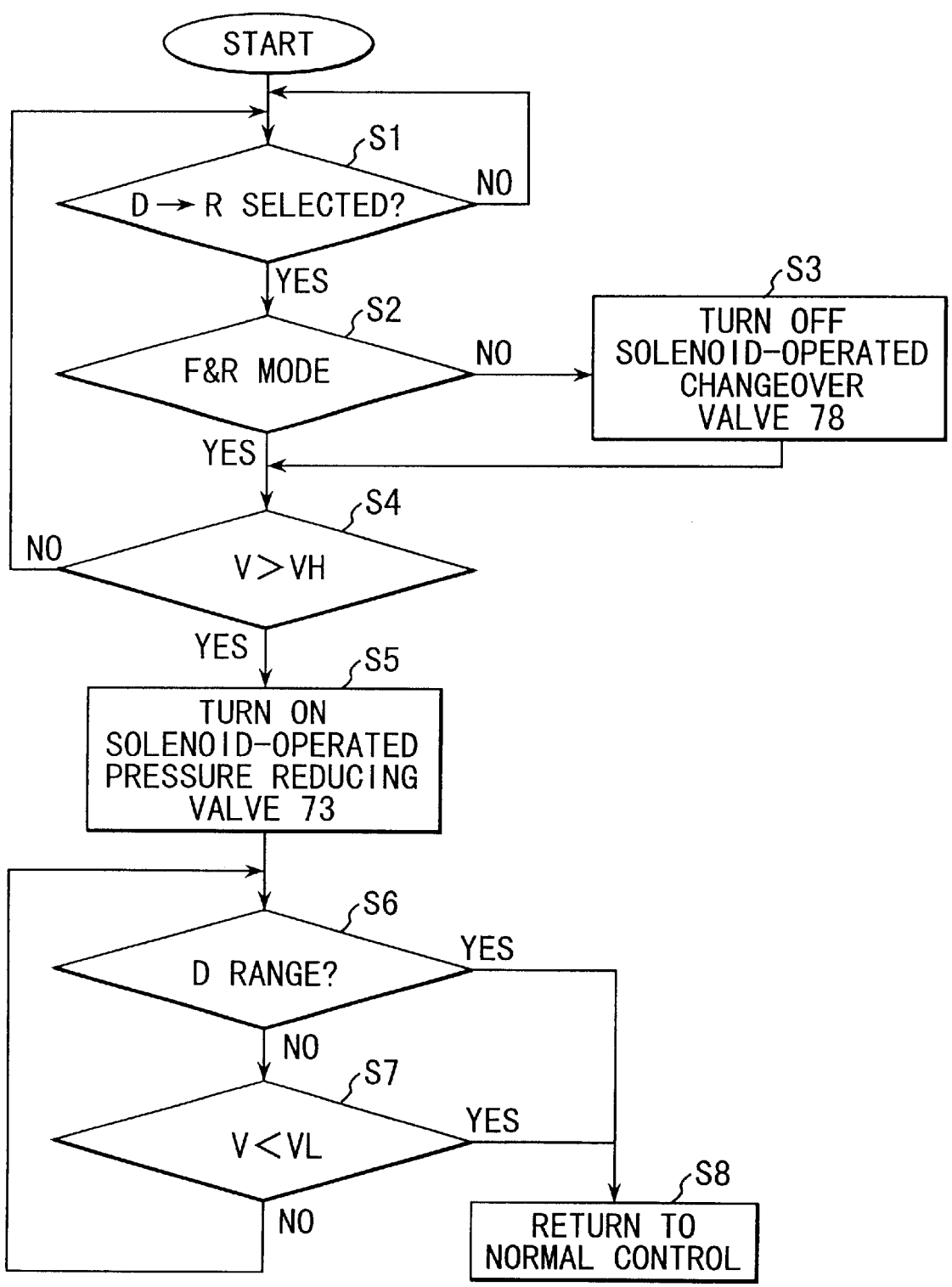
FIG. 12 is a flowchart showing a brake prohibiting control.

Next, a reverse inhibiting control, namely, a control for inhibiting the operation of the reverse brake 43, will be described with reference to a flowchart shown in FIG. 12. Referring to FIG. 10, there is provided a mode judgment section 95 and a brake operation inhibiting judgment section 96 in the control section 91. The brake operation inhibiting judgment section 96 outputs a control signal to the solenoid 73a of the solenoid-operated pressure reducing valve 73 and the solenoid 78a of the solenoid-operated changeover valve 78, only when the range detecting means 92 and the vehicle speed detecting means 93 meet predetermined conditions.

When the vehicle travels in a normal condition, either F & R Mode or Lockup Mode is selected according to a shift-schedule shown in FIG. 11 and the solenoid-operated changeover valve 78 is controlled accordingly. However, when "D" range is changed to "R" range during the forward running, the hydraulic pressure within the clutch cylinder 32 of the forward clutch 34 is discharged rapidly through the manual valve 75 and on the other hand, the hydraulic pressure starts to be charged into the brake cylinder 45 of the reverse brake 43 through the manual valve 75.

At this moment, when the vehicle speed is still high, for example above 15 km/h, retaining the Lockup Mode, first at a step S1 it is judged that the select lever is shifted from "D" range to "R" range. After that, when it is judged at a step S2 that the transmission is in the Lockup Mode, the program goes to a step S3 where the solenoid of the solenoid-operated changeover valve 78 is switched off to turn to the F & R Mode. Next, at a step S4, it is judged whether or not the vehicle speed is above a specified value VH, for example 10 km/h. If the vehicle speed is above the specified value VH, the program goes to a step S5 wherein the solenoid-operated pressure reducing valve 73 is energized. Thus, the slip pressure control valve 71 is operated so that the hydraulic pressure within the brake cylinder 45 of the reverse brake 43 is discharged.

Accordingly, in the case where "R" range is selected when the vehicle travels forwardly at a speed larger than a specified value for example 10 km/h, the hydraulic pressure of the forward clutch 34 is discharged rapidly and at the same time the hydraulic pressure of the reverse brake 43 is also discharged from the slip pressure control valve 71 before engagement, so that the transmission turns to a neutral condition, whereby an interlock between the reverse brake 43 and the forward clutch 34 is successfully avoided.

After that, when it is judged at a step S6 that the select lever is returned to "D" range or any range other than "R" range, or when it is judged at a step S7 that the vehicle speed is below a specified vehicle speed VL, for example 5 km/h, at a step S8 the program returns to a normal control. Thus, the interlock between the reverse brake 43 and the forward clutch 34 can be prevented only by controlling the solenoid-operated pressure reducing valve 73 without relying upon other means such as a safety lock valve.

The aforementioned reverse inhibiting control is also available when "D" range is selected during running at "R" range.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A hydraulic control system for a continuously variable transmission mounted on a motor vehicle having an engine, a torque converter connected with said engine via a lockup clutch for transmitting torque to said transmission, a hydraulic pressure source driven by said engine for generating a hydraulic pressure, a forward and reverse changeover apparatus including a forward clutch and a reverse brake, actuators for actuating said forward clutch and said reverse brake, and an input and an output shaft, said transmission including a primary pulley provided on said input shaft, a secondary pulley provided on said output shaft and a drive belt wound around said primary and secondary pulleys, comprising:

a secondary pressure control valve for regulating said hydraulic pressure to a secondary pressure for actuating said secondary pulley;

a clutch pressure control valve for regulating said secondary pressure to a clutch pressure lower than said secondary pressure and for supplying said clutch pressure at least to either of said lockup clutch and said actuators;

a lubrication pressure line for supplying a lubrication pressure discharged from said secondary pressure control valve;

a release chamber provided in said lockup clutch;

a release pressure line connected with said release chamber;

an oil cooler for cooling hydraulic fluid of said torque converter;

a cooler line connected to said oil cooler;

an apply chamber provided in said lock-up clutch;

an apply pressure line connected with said apply chamber;

a clutch pressure line for supplying said clutch pressure;

a slip pressure control valve for reducing said clutch pressure and generating a slip pressure;

a slip pressure line for supplying said slip pressure; and a switching valve switchable between a position where said lubrication pressure line communicates with said release pressure line and simultaneously said cooler line communicates with said apply pressure line and simultaneously said slip pressure line communicates with said changeover pressure line, and a position where said clutch pressure line communicates with said apply pressure line and simultaneously said slip pressure line communicates with said release pressure line, and simultaneously said lubrication pressure line communicates with said cooler line and simultaneously said clutch pressure line communicates with said changeover pressure line.

2. The hydraulic control system according to claim 3, wherein said switching valve is controlled in accordance with the vehicle speed and the throttle opening angle.

3. The hydraulic control system according to claim 3, further comprising:

a restrictor provided at the inlet of said lubrication pressure line to the switching valve so as to restrict lubrication oil flowing through said oil cooler when said lockup clutch is engaged.

4. The hydraulic control system according to claim 3, wherein said switching valve includes a spool between an inlet port connected with said lubrication pressure line and an outlet port connected with said cooler line and said spool is provided with a notch-shaped restrictor.

5. The hydraulic control system according to claim 3, wherein said switching valve includes a spool between an inlet port connected with said lubrication pressure line and an outlet port connected with said cooler line and said spool is provided with a step-shaped restrictor.

6. The hydraulic control system according to claim 3, further comprising:

a bypass line connected across said lubrication pressure line and said clutch pressure line; and a check valve provided on said bypass line for allowing hydraulic fluid to flow from said lubrication pressure line to said clutch pressure line and for blocking flow of hydraulic fluid from said clutch pressure line to said lubrication pressure line.

7. A hydraulic control system for a continuously variable transmission mounted on a motor vehicle having an engine, a torque converter connected with said engine via a lockup clutch for transmitting torque to said transmission, a hydraulic pressure source driven by said engine for generating a hydraulic pressure, a forward and reverse changeover apparatus including a forward clutch and a reverse brake, actuators for actuating said forward clutch and said reverse brake, and an input and an output shaft, said transmission including a primary pulley provided on said input shaft, a secondary pulley provided on said output shaft and a drive belt wound around said primary and secondary pulleys, comprising:

a secondary pressure control valve for regulating said hydraulic pressure to a secondary pressure for actuating said secondary pulley;

a clutch pressure control valve for regulating said secondary pressure to a clutch pressure lower than said secondary pressure and for supplying said clutch pressure at least to either of said lockup clutch and said actuators; and control means for stopping a supply of hydraulic pressure to said actuators of said forward and reverse changeover apparatus when an adverse running mode is selected during running at a speed larger than a specified value.

8. A hydraulic control system for a continuously variable transmission mounted on a motor vehicle having an engine, a torque converter connected with said engine via a lockup clutch for transmitting torque to said transmission, a hydraulic pressure source driven by said engine for generating a hydraulic pressure, a forward and reverse changeover apparatus including a forward clutch and a reverse brake, actuators for actuating said forward clutch and said reverse brake, and an input and an output shaft, said transmission including a primary pulley provided on said input shaft, a secondary pulley provided on said output shaft and a drive belt wound around said primary and secondary pulleys, comprising:

a secondary pressure control valve for regulating said hydraulic pressure to a secondary pressure for actuating said secondary pulley;

a clutch pressure control valve for regulating said secondary pressure to a clutch pressure lower than said secondary pressure and for supplying said clutch pressure at least to either of said lockup clutch and said actuators;

a select lever provided in a passenger compartment of the motor vehicle for selecting the forward running mode or the reverse running mode;

a reverse signal valve operatively interlocked with said select lever and selectively communicable with said clutch pressure control valve for regulating said clutch pressure to a lower pressure when said select lever selects the forward running mode than when said select lever selects the reverse running mode;

a manual valve operatively interlocked with said select lever for controlling the hydraulic pressure supplied to said actuators of said forward and reverse changeover apparatus;

a first valve rod extending from said manual valve;

a second valve rod extending from said reverse signal valve;

an actuating member for connecting with respective ends of said first valve rod and second-valve rod; and an operating pin rotatably connected with said actuating member and connected with said select lever for operating said manual valve and said reverse signal valve simultaneously through said actuating member.

9. A hydraulic control system for a continuously variable transmission mounted on a motor vehicle having an engine, a torque converter connected with said engine via a lockup clutch for transmitting torque to a wheel via said transmission, a forward and reverse changeover apparatus including a forward clutch and a reverse brake hydraulically and coaxially connected to said torque converter for being manually operable by a select lever, a primary pulley directly and coaxially connected to said forward and reverse changeover apparatus, a secondary pulley provided in parallel with said primary pulley for changing a speed thereof by a belt wound around both of said primary and secondary pulleys, a hydraulic pump driven by said engine for generating a hydraulic pressure, a primary pressure control valve hydraulically communicating with said hydraulic pump for controlling a speed ratio of said primary and secondary pulleys by applying hydraulic pressure thereto, and a secondary pressure control valve for regulating said hydraulic pressure to a secondary pressure for actuating said secondary pulley, comprising:

a clutch pressure control valve connected to a secondary pressure line between said hydraulic pump and said primary pressure control valve for regulating said secondary pressure to a clutch pressure and for supplying said clutch pressure to at least one of said lockup clutch and said forward and reverse changeover apparatus at a lower pressure than that of said secondary pressure when said forward clutch is selected;

a reverse signal valve directly connected to said select lever and hydraulically communicating with said clutch pressure control valve for regulating said clutch pressure to a lower pressure when said select lever selects the forward running mode than when the select lever selects the reverse running mode; and a switching valve hydraulically interposed between said clutch pressure control valve and said lockup clutch for controlling supply of said clutch pressure to said lockup clutch and for communicating with an oil cooler via a cooling passage.

* * * * *